(12) United States Patent
Wise et al.

(10) Patent No.: US 11,341,197 B2
(45) Date of Patent: May 24, 2022

(54) RECOMMENDATION SYSTEM BASED ON ADJUSTABLE VIRTUAL INDICIUM

(71) Applicant: InvestCloud Inc, West Hollywood, CA (US)

(72) Inventors: John W. Wise, West Hollywood, CA (US); Yaela Shamberg, Santa Monica, CA (US)

(73) Assignee: InvestCloud Inc, West Hollywood, CA (US)

( * ) Notice: Subject to any disclaimer, the term of this patent is extended or adjusted under 35 U.S.C. 154(b) by 190 days.

(21) Appl. No.: 16/660,036

(22) Filed: Oct. 22, 2019

(65) Prior Publication Data

US 2021/0117489 A1     Apr. 22, 2021

(51) Int. Cl.
*G06F 16/00* (2019.01)
*G06F 16/9535* (2019.01)
*G06F 16/9538* (2019.01)
*G06F 16/9536* (2019.01)
*G06F 16/9537* (2019.01)

(52) U.S. Cl.
CPC ...... *G06F 16/9535* (2019.01); *G06F 16/9536* (2019.01); *G06F 16/9537* (2019.01); *G06F 16/9538* (2019.01)

(58) Field of Classification Search
CPC ............. G06F 16/9535; G06F 16/9537; G06F 16/9536; G06F 16/9538
See application file for complete search history.

(56) References Cited

U.S. PATENT DOCUMENTS

2015/0095269 A1\* 4/2015 Matignon ................ G06N 5/02
                                                                706/11
2021/0117489 A1\* 4/2021 Wise .................... G06F 16/9537

\* cited by examiner

*Primary Examiner* — Hung Q Pham
(74) *Attorney, Agent, or Firm* — Patent Ingenuity, P.C.; Samuel K. Simpson

(57) ABSTRACT

A process receives, via a processor, a plurality of rules corresponding to a plurality of virtual indicium attributes that are displayed in conjunction with a virtual indicium. Each of the plurality of rules associates a data object with at least one of the plurality of virtual indicium attributes. Further, each of the plurality of virtual indicium attributes corresponds to a time-based metric. Moreover, the process retrieves, from a web portal database, one or more pre-generated web portal features corresponding to at least one of the plurality of rules. The process also generates, via the processor, a web portal based on the plurality of rules by composing the pre-generated web portal features with remaining web portal features to diminish redundancy of computing resources. Additionally, the process receives, via the processor, a user input via the virtual indicium corresponding to the time-based metric.

18 Claims, 9 Drawing Sheets

RECOMMENDATION SYSTEM BASED ON ADJUSTABLE VIRTUAL INDICIUM

BACKGROUND

1. Field

This disclosure generally relates to the field of computing systems. More particularly, the disclosure relates to software application code generation.

2. General Background

With recent developments in computing systems, financial technology ("Fintech") platforms have allowed financial institutions/advisors to communicate with end-users via web portals. Rather than having to rely solely on a human financial advisor, end-users may access the web portal to review financial information, personal data, etc.

Yet, the aggregation of data for display at the web portal is often performed in a computationally intensive, inefficient manner. For example, current configurations typically obtain data pertaining to a particular user from disparate sources (e.g., various databases, user-inputted forms, etc.); such sources typically include numerous data redundancies. For example, a user may typically fill out various forms that ask for similar, yet also different, information. Not only does a user have to fill out multiple forms with the same information, such configurations often have to expend computational resources scouring through redundant data from multiple sources (forms, databases, etc.). For example, a user may provide documents such as a copy of a driver's license and a passport to various databases over the span of one year. After obtaining a copy of the user's driver's license, current configurations may still have to scour through databases with that same driver's license to find a copy of the user's passport. Such redundancies have led not only to computational efficiencies for web portal generation and operation, but also to slower search times.

Further, web portals often vary from entity to entity. For example, a first entity (e.g., financial institution) may have a first web portal to which it provides access to its customers, whereas a second entity (e.g., a different financial institution) may have a second web portal that is configured with different features than the first entity's web portal. Current configurations would typically be built by having a first human software developer generate code for the first web portal, and a second human software developer generate code, independently of the first human software developer, for the second web portal. In other words, the generation of multiple Fintech web portals is often performed in a computationally inefficient manner also.

SUMMARY

In one aspect of the disclosure, a computer program product is provided. The computer program product comprises a non-transitory computer useable storage device having a computer readable program. The computer readable program when executed on a computer causes the computer to receive, via a processor, a plurality of rules corresponding to a plurality of virtual indicium attributes that are displayed in conjunction with a virtual indicium. Each of the plurality of rules associates a data object with at least one of the plurality of virtual indicium attributes. Further, each of the plurality of virtual indicium attributes corresponds to a time-based metric.

Moreover, the computer is caused to retrieve, from a web portal database, one or more pre-generated web portal features corresponding to at least one of the plurality of rules. The computer is also caused to generate, via the processor, a web portal based on the plurality of rules by composing the pre-generated web portal features with remaining web portal features to diminish redundancy of computing resources. Additionally, the computer is caused to receive, via the processor, a user input via the virtual indicium corresponding to the time-based metric. Further, the computer is caused to generate, via the processor, a recommendation for a user associated with the user input to obtain the data object. Finally, the computer is caused to generate, via the processor, a recommendation indicium corresponding to the recommendation. The recommendation indicium is displayed by the web portal.

In another aspect of the disclosure, a system has a web portal database that stores the one or more pre-generated web portal features corresponding to at least one of a plurality of rules. In addition, the system has a processor that performs the functionality of the computer program product.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

A recommendation system based on an adjustable virtual indicium is provided. The recommendation system generates recommendations for documents that the user should obtain according to one or more quantifiable, demarcated metrics (e.g., a time-based metric such as age); further, the recommendation system generates the recommendations based on one or more inputs that correspond to such metrics. For example, an adjustable virtual indicium such as a visual slider may be displayed on a graphical user interface ("GUI") to allow a user to select a particular metric. The recommendation system may then recommend one or more documents based on the selected metric.

Figure 1:
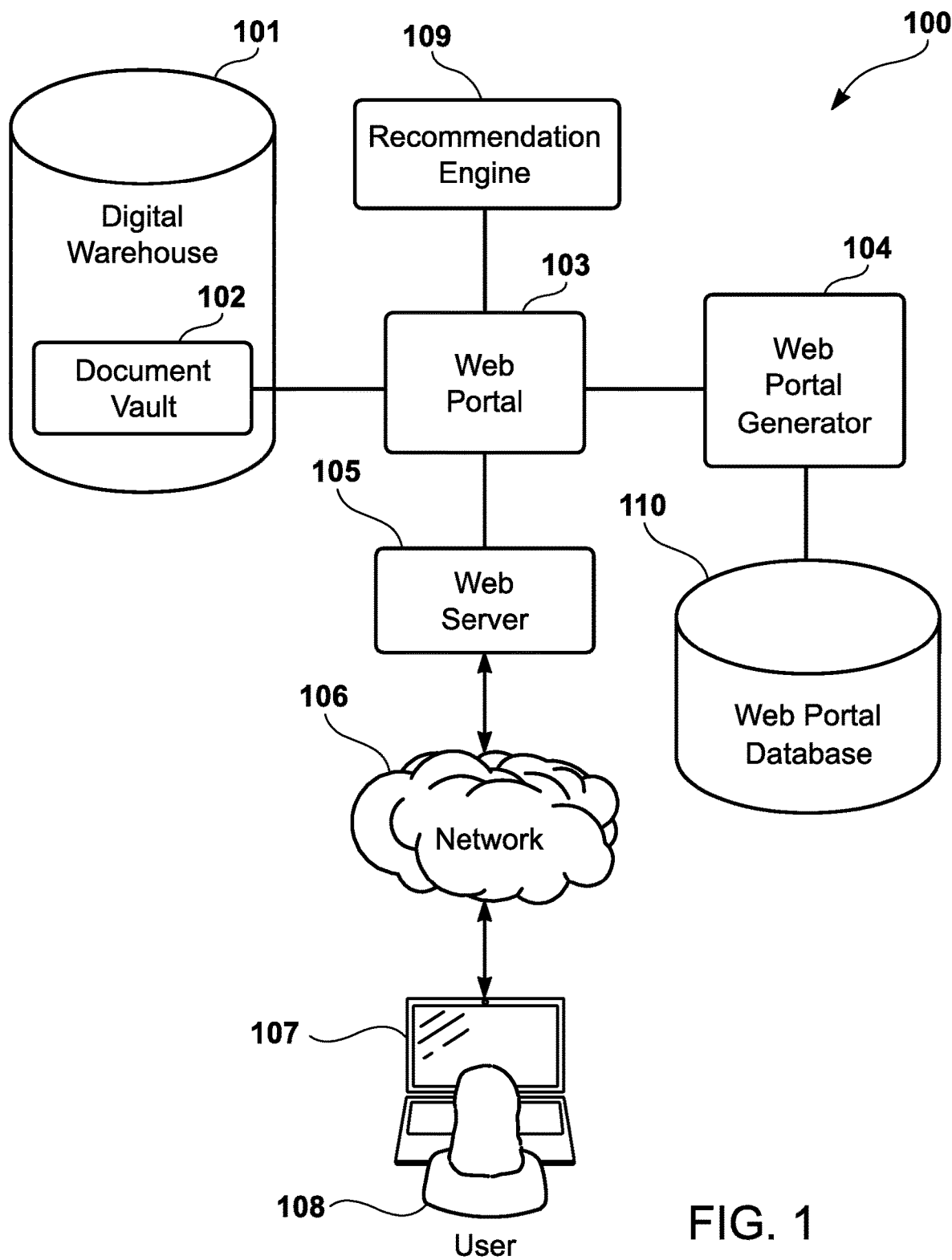
FIG. 1 illustrates a recommendation system that provides one or more recommendations via a web portal to a user.

FIG. 1 illustrates a recommendation system 100 that provides one or more recommendations via a web portal 103 to a computing device 107 (e.g., laptop, personal computer, smartphone, tablet device, etc.) utilized by the user 108. The recommendation system 100 includes a digital warehouse 101 that stores a variety of data, which may include a document vault 102. For example, the document vault 102 may provide for centralized storage of the documents pertaining to the user 108. In other words, rather than having multiple copies of documents pertaining to the user 108 stored in disparate databases, the document vault 102 may be used to avoid redundancies.

Further, the recommendation system 100 allows a web portal 103, in operable communication with a web server 105 via a network 106, to access the document vault 102. For instance, the web portal 103 may be customized for a particular entity (e.g., financial institution) to allow its customers (e.g., user 108) to view various data. Accordingly, the web portal 103 may obtain, and display, various documents from the document vault 102 that are particular to the user 108.

Further, the web portal 103 may be generated by a web portal generator 104 according to one or more rules. For instance, the web portal generator 104 may utilize one or more criteria (e.g., virtual indicium attributes) for generating the particular web portal 103. To further elaborate, each web portal 103 may be associated with one or more rules particular to that web portal 103. For example, a particular web portal 103 may have rules for obtaining certain types of documents from the document vault 102, and providing recommendations to the user 108 via the recommendation engine 109, based on the virtual indicium (e.g., virtual slider) being positioned at, or in proximity to, a particular virtual metric (e.g., age, or other time-based, demarcation).

The web portal generator 104 may access a web portal database 110 to determine overlapping features from previously generated web portals. For example, similar rules, virtual indicia, virtual metrics, etc. may have been used for previous web portals. The web portal generator 104 improves the functioning of a computer by removing, or at least reducing, redundancies in the generation of the multiple web portals. Rather than have a software developer have to start developing a web portal for each entity from scratch, the web portal generator 104 allows for aggregating previously generated virtual features, rules, etc., with newly generated virtual features, rules, etc. As a result, less computing resources have to be utilized by a processor when generating a new web portal than would be performed with previous configurations.

Further, the recommendation engine 109 prepares recommendations according to the one or more rules pertaining to the web portal 103. For example, a rule may be established such that a particular document, or type of document, is retrieved from the document vault 102 based on a user input corresponding to the virtual indicium at a particular virtual metric. In other words, in one embodiment, the recommendation engine 109 may prepare recommendations according to one or more predetermined rules. In another embodiment, the recommendation engine 109 may modify, or update, recommendations based on actively monitoring, and analyzing, what documents have been obtained by various users 108 according to various time metrics. For example, the recommendation engine 109 may determine that a majority of users 108 have obtained a particular document by a certain age. The recommendation engine 109 may then recommend that particular document be obtained by the user 108 when the user 108 provides a user input with respect to the virtual indicium at the time metric associated with that age. Further, the recommendation engine 109 may adjust display of that particular document at various time metrics via machine learning according to the document retrieval of users, as determined by the recommendation engine 109 based on statistical analysis.

FIGS. 2A-2F illustrates example screenshots of screens of the web portal 103 illustrated in FIG. 1, which are based on the recommendations provided by the recommendation system 100. Upon receiving a user input from the user 108, via a virtual indicium 201 displayed on a GUI of the web portal 103, the recommendation engine 100 generates a recommendation for the user 108 to obtain a particular document and generates a virtual indicium 201 corresponding to a time metric (e.g., an age of the user 108) at which the recommendation system 100 suggests the user 108 have that document. For example, the virtual indicium 201 may be a virtual image, such as a geometrical shape, that may be adjusted (i.e., slid) via a user input (e.g., mouse cursor drag, touch screen input, gesture, etc.) with respect to one or more virtual indicium attributes 202. For instance, the virtual indicium attributes 202 may be time demarcations (e.g., ages) corresponding to the user 108, as displayed across a time span display 203 (e.g., horizontal bar, vertical bar, circle, etc.).

Figure 2A:
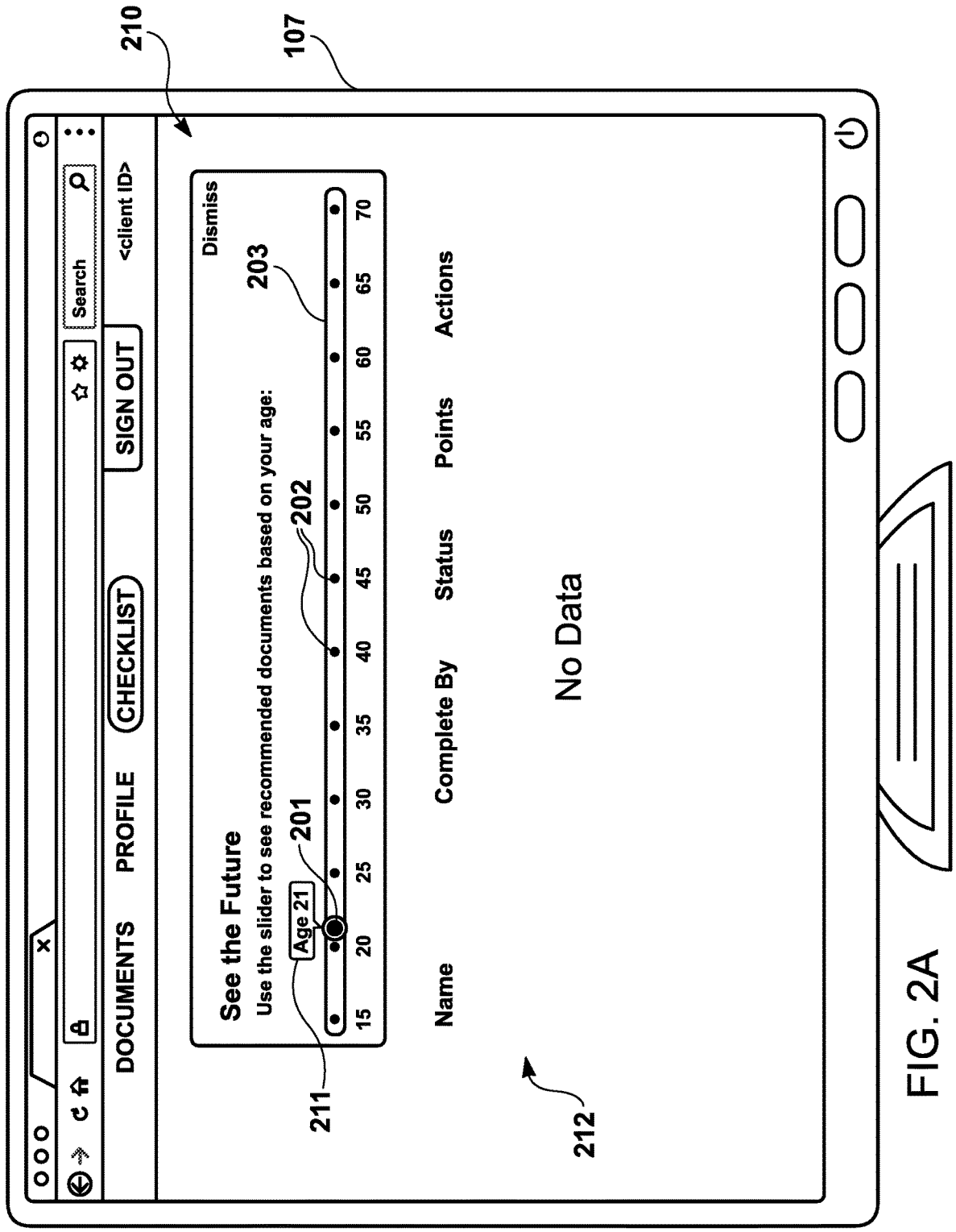
FIG. 2A illustrates an example of a screenshot of the web portal in which the user has slid the virtual indicium to a virtual indicium attribute of age twenty one.

FIG. 2A illustrates an example of a screenshot 210 of the web portal 103, as displayed by the computing device 107, in which the user 108 has slid the virtual indicium 201 (e.g., circular virtual slider) to a virtual indicium attribute 202 of age twenty one. In one embodiment, text corresponding to increments (e.g., five years) along the time span display 203. Further, a popup box 211, may be displayed to illustrate an age that appears in between the time increments (e.g., twenty one).

Additionally, the web portal 103 (FIG. 1) may render a recommended data objects area 212 that displays data objects (e.g., documents pertaining to the user 108) that the recommendation engine 109 recommends the user 108 obtain/complete by the age displayed on the time span display 203 in proximity to the virtual indicium 201. Further, the recommended data objects area 212 may render various fields (e.g., name field, complete by field, status field, points field, and actions field). In one embodiment, the recommendation engine 109 may provide an incentive to the user 108 along with the recommendation (e.g., points for obtaining/completing a certain document). In another embodiment, the recommendation engine 109 may indicate any particular actions (e.g., renewal of a document) that are required to be taken by the user 103. The aforementioned fields may also be automatically configurable according to a plurality of rules generated by the recommendation system 100. For example, the points field, or any of the other fields, may be dynamically updated by the recommendation system 100 based on the particular web portal 103 and/or the particular user 108.

Figure 2B:
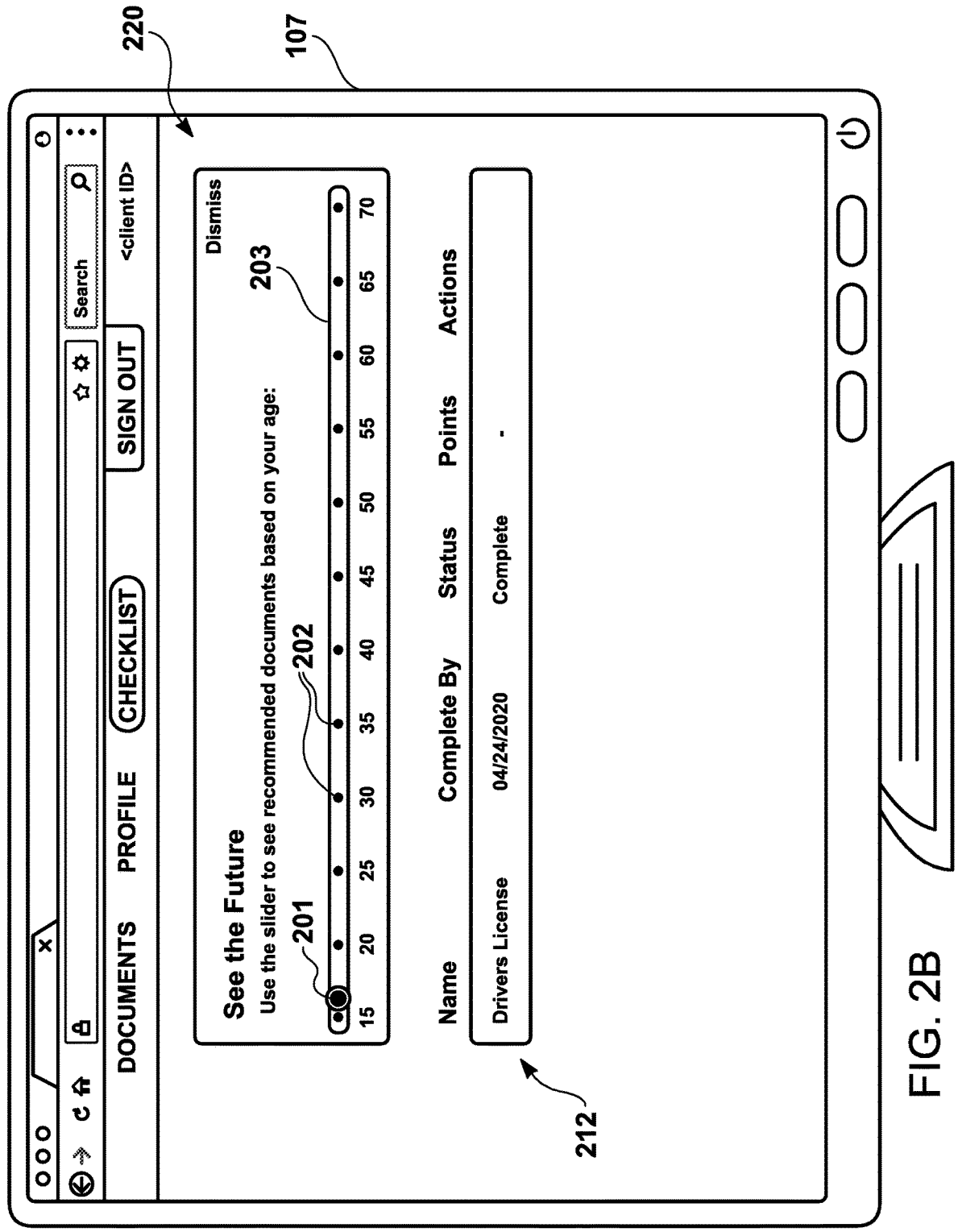
FIG. 2B illustrates a screenshot of the virtual indicium being slid to an age of sixteen along the time span display such that a driver's license document is recommended in the time span display.

Although the screenshot 210 illustrated in FIG. 2A does not illustrate any particular documents for the user 108 to complete by the age of twenty one, FIG. 2B illustrates a screenshot 220 of the virtual indicium 201 being slid to an age of sixteen along the time span display 203 such that a driver's license document is recommended in the time span display 203. Even though the age is between two rendered time-based demarcations, the age does not have to be illustrated in a popup box 211, as provided for in FIG. 2A.

For example, the "complete by" field may be dynamically updated to reflect the age indicated along the time span display 203. Further, the recommended data objects area 212 indicates that obtaining such document has a status of complete for the user 108.

Figure 2C:
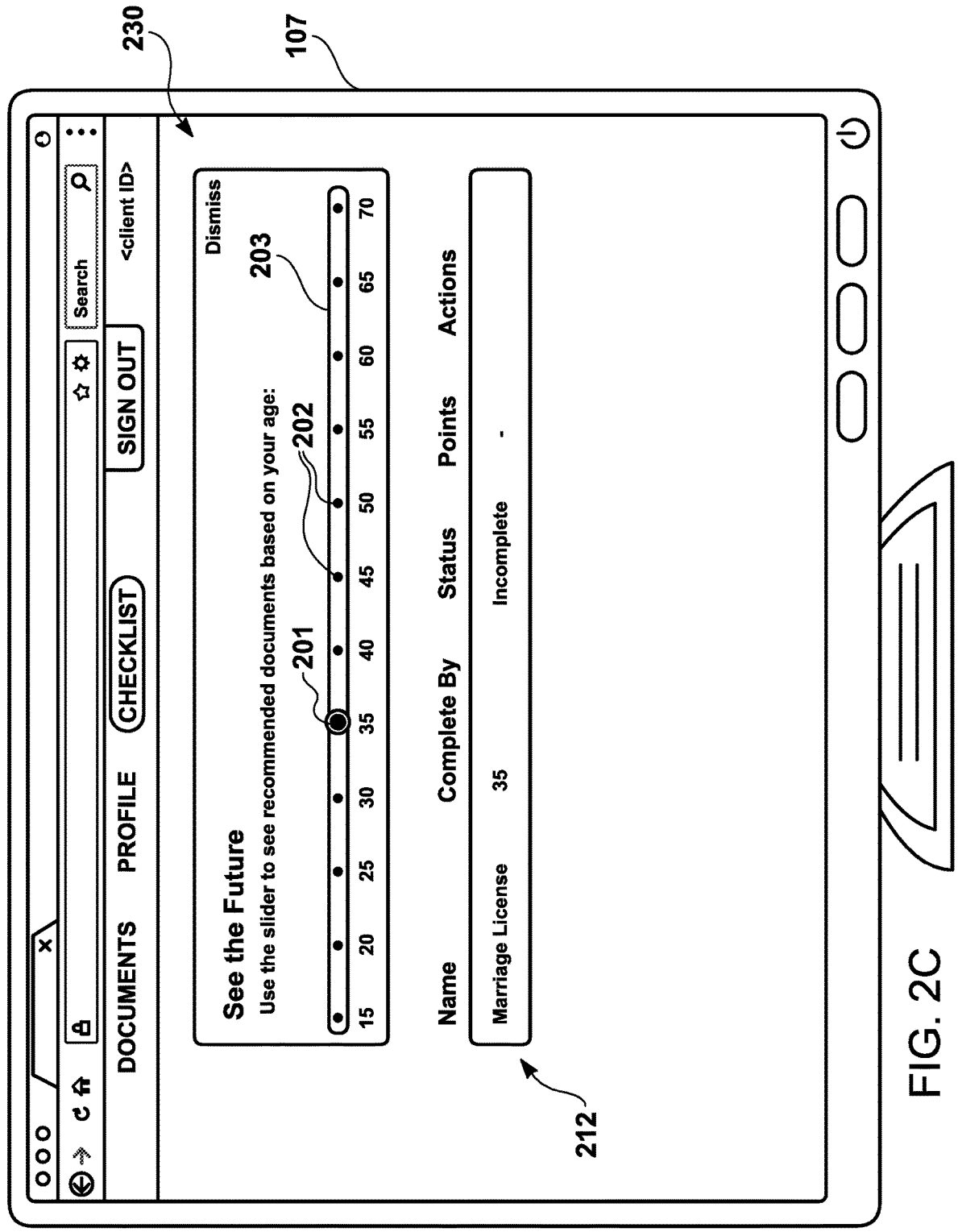
FIG. 2C illustrates a screenshot of the virtual indicium being slid to an age of thirty five along the time span display such that a marriage license is recommended in the time span display.

As yet another example, FIG. 2C illustrates a screenshot 230 of the virtual indicium 201 being slid to an age of thirty five along the time span display 203 such that a marriage license is recommended in the time span display 203. The age to which the virtual indicium 201 is slid reflects the exact time-based demarcation in this instance. Further, the recommended data objects area 212 indicates that obtaining such document has a status of incomplete for the user 108.

Figure 2D:
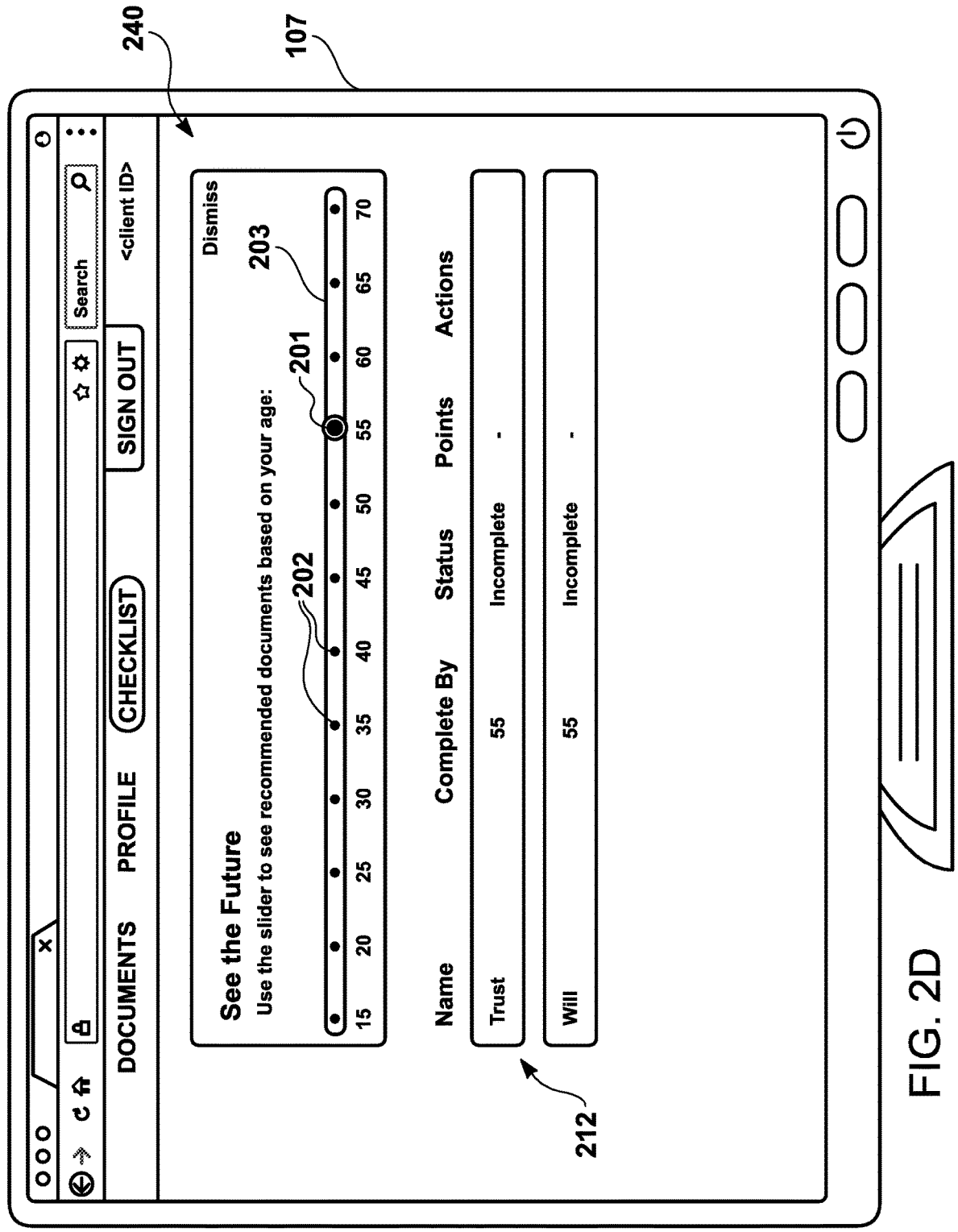
FIG. 2D illustrates a screenshot of the virtual indicium being slid to an age of fifty five along the time span display such that two documents, a trust and a will, are recommended in the time span display.

As another example, FIG. 2D illustrates a screenshot 240 of the virtual indicium 201 being slid to an age of fifty five along the time span display 203 such that two documents, a trust and a will, are recommended in the time span display 203. The age to which the virtual indicium 201 is slid reflects the exact time-based demarcation in this instance. Further, the recommended data objects area 212 indicates that obtaining such documents has a status of incomplete for the user 108.

Figure 2E:
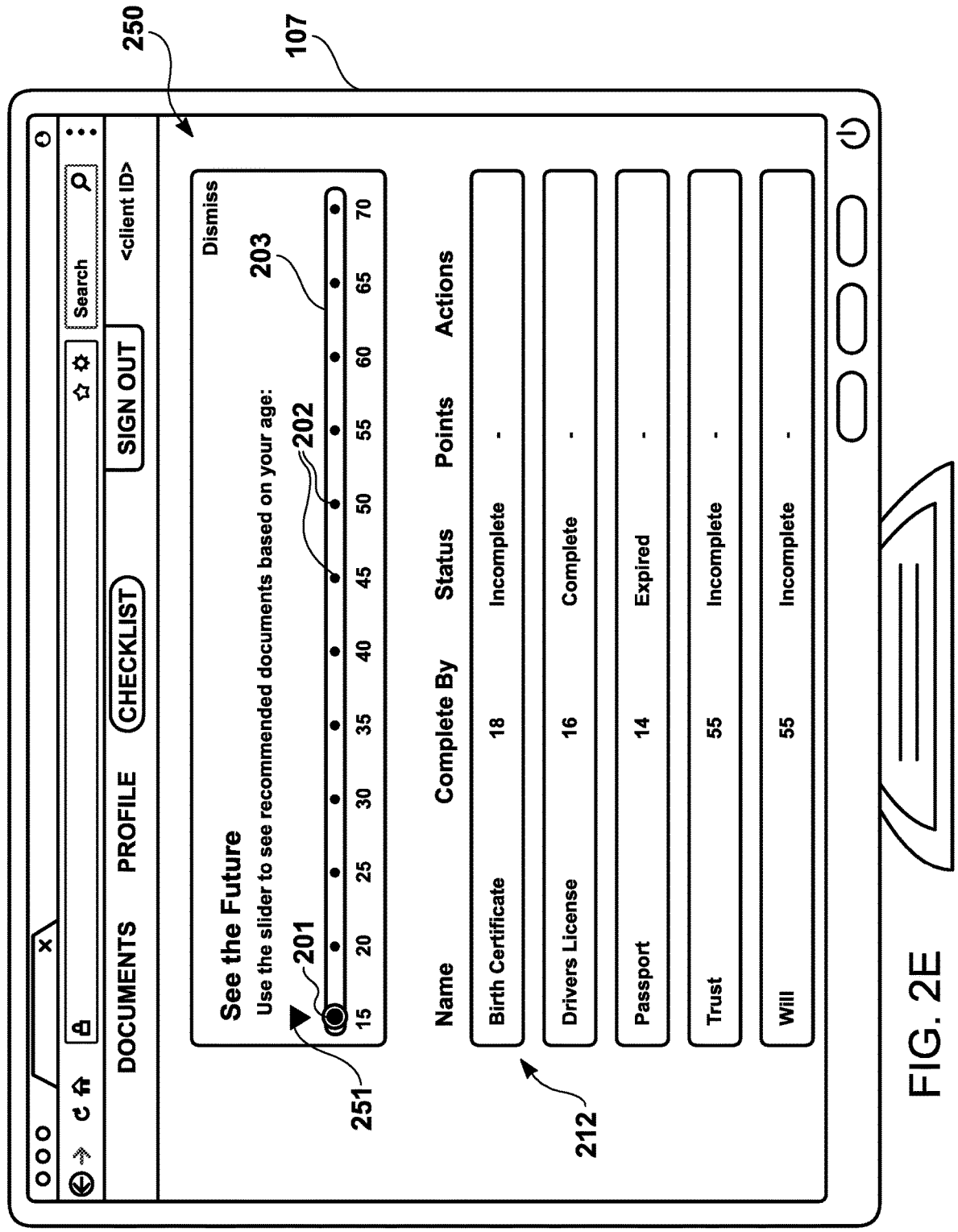
FIG. 2E illustrates a screenshot of the virtual indicium being slid to the first age demarcation possible.

In an alternative embodiment, the user 108 may obtain a complete listing of all documents pertaining to that user 108 in the recommended data objects area 212. For example, FIG. 2E illustrates a screenshot 250 of the virtual indicium 201 being slid to the first age demarcation possible (e.g., fifteen years old). For example, positioning of the virtual indicium 201 at that first time demarcation may activate a complete listing of all recommended documents pertaining to the user 108. An additional virtual indicium 251 (e.g., an arrow) may be illustrated to indicate that a complete listing is being provided. Alternatively, the user 108 may activate an additional button/feature that indicates that the user 108 wants to view a complete listing, of documents for all ages.

Accordingly, the screenshots illustrated in FIGS. 2A-2E illustrate recommendations on life steps based on a user's age. As the user 108 slides the virtual indicium 201 to the right (e.g., to an age older than the current age of the user 108), additional documents may appear in the recommended data objects area 212.

Figure 2F:
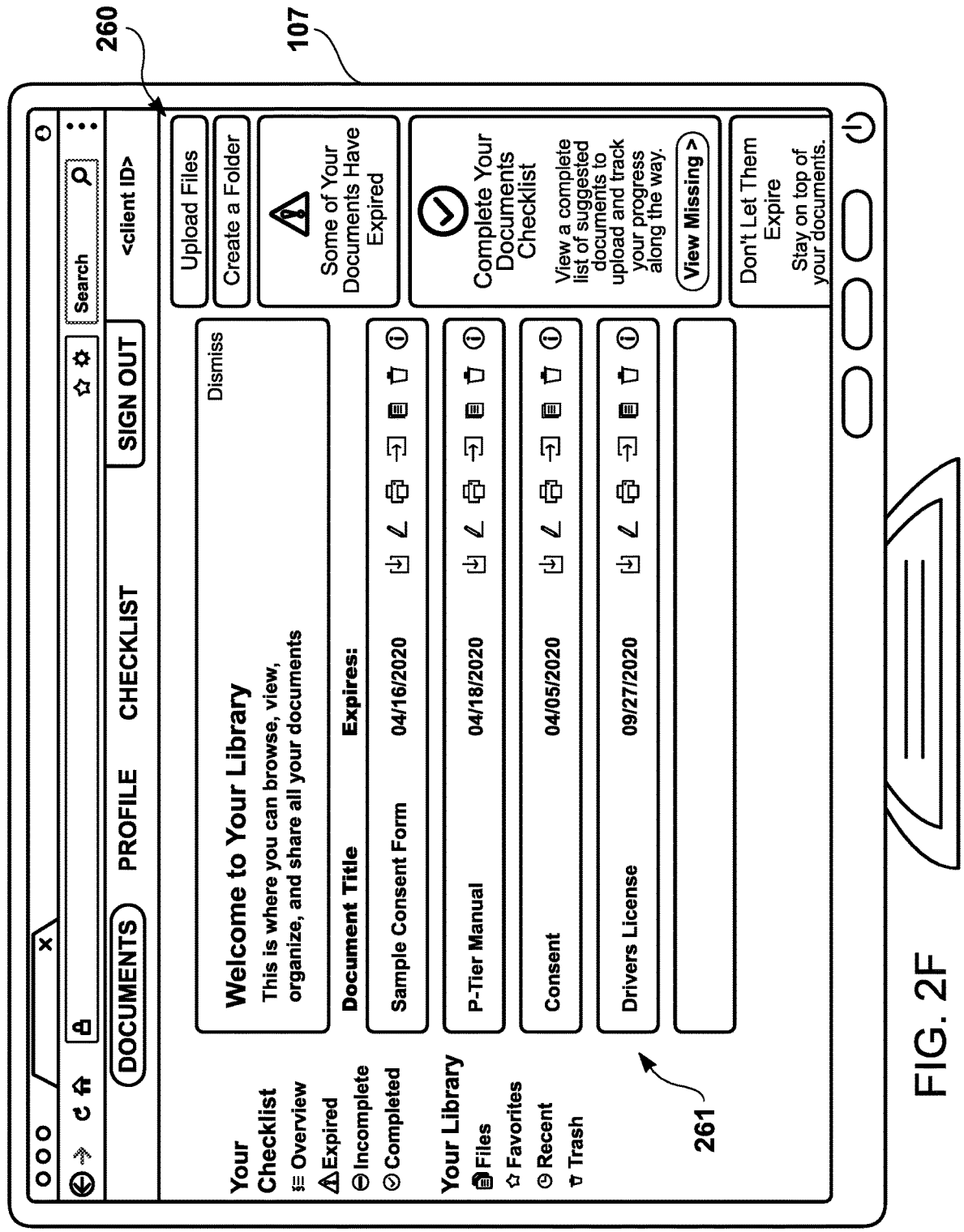
FIG. 2F illustrates a screenshot of a data object library.

Finally, FIG. 2F illustrates a screenshot 260 of a data object library 261. Rather than displaying recommended data objects (e.g., documents pertaining to the user 108) activated by the virtual indicium 201, the web portal 103 may display all of the current data objects of the user 108 for viewing by the user 108. In another embodiment, the web portal 103 may display data objects that the recommendation engine 109 recommends that the user 108 have by certain ages in addition to the current data objects of the user 108.

Figure 3:
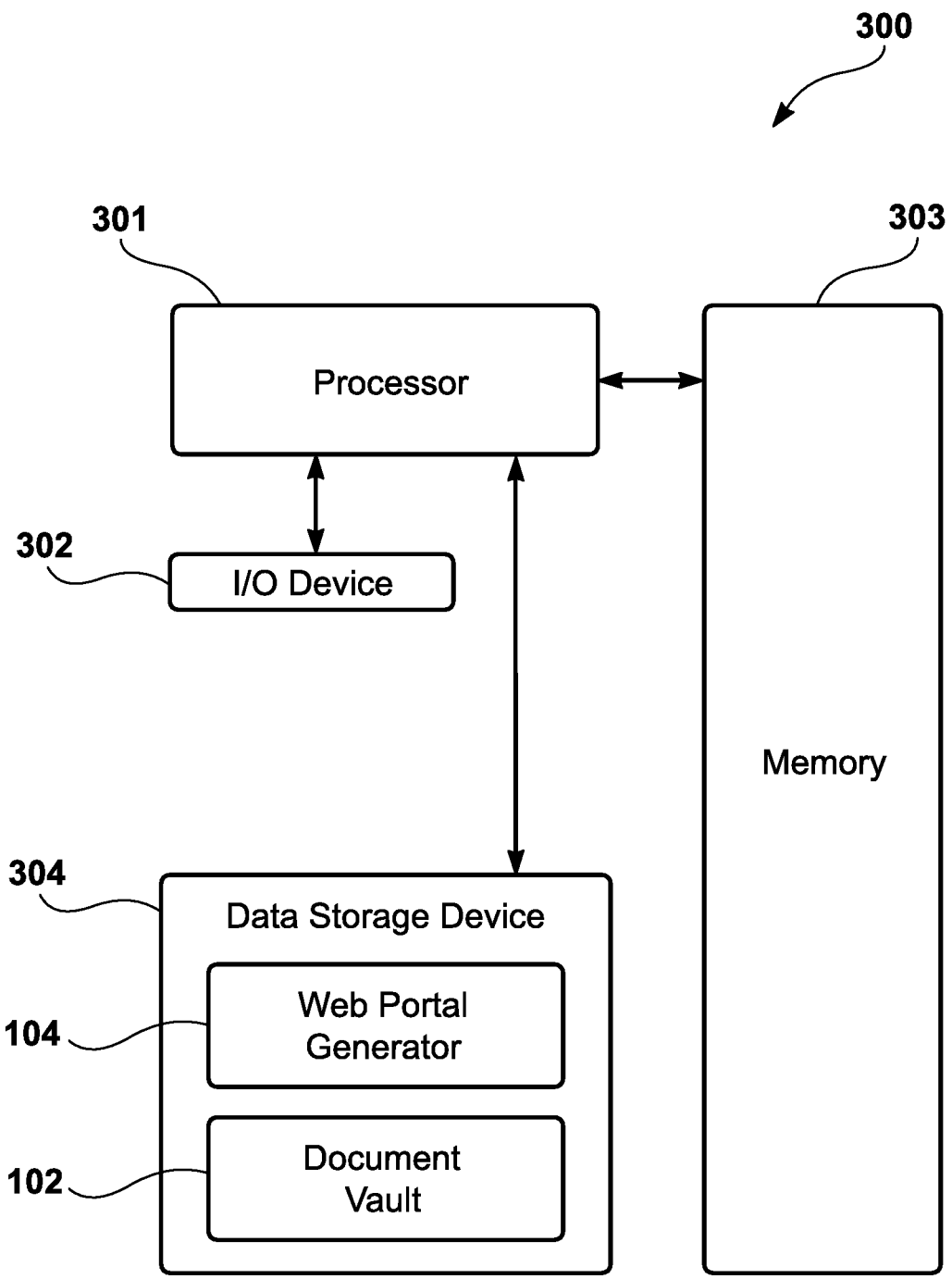
FIG. 3 illustrates the internal components of the recommendation system illustrated in FIG. 1.

FIG. 3 illustrates the internal components of the recommendation system 100 illustrated in FIG. 1. In one embodiment, the recommendation system 100 (FIG. 1) is implemented utilizing a specialized computer or any other hardware equivalents. The recommendation system 100 has a processor 301, a memory 303 (e.g., random access memory and/or read only memory), web portal generator 104, document vault 102, a data storage device 304 that stores the web portal generator 104 and the document vault 102, and various input/output ("I/O") devices 302 (e.g., audio/video outputs, audio/video inputs, a receiver, a transmitter, a speaker, a display, an image capturing sensor, a clock, an output port, a user input device, etc.).

The recommendation system 100 improves the technological process of web portal generation for a Fintech platform. By composing the web portal 103 according to one or more pre-generated web portal features corresponding to such rules (i.e., overlapping features from previously generated web portal features stored in the web portal database 110) in addition to remaining web portal features (i.e., features that were not present in previously generated web portals), the recommendation system 100 ensures that redundancies of computing resource utilization present in previous configurations are either eliminated or substantially diminished. Accordingly, the recommendation system 100 improves the functioning of a computer by utilizing lesser memory requirements and obtaining increased computational efficiency for automatically generating the web portal. Rather than merely using a computer as a tool to automate conventional activity (e.g., automating a financial recommendation), the recommendation system 100 incorporates specific rules to improve the technological process of generating a web portal. Therefore, memory requirements and computational inefficiencies may be reduced through the technological process of generating an improved web portal.

Further, the recommendation system 100 improves the functioning of a computer by archiving data in a centralized manner to improve computing resource efficiency. In contrast with previous configurations that often searched for documents corresponding to the user 108 in disparate locations with multiple instances of the same document, the recommendation system 100 stores data objects in the document vault 102 of the digital warehouse 101; as a result, data storage redundancies may be eliminated, or substantially diminished. Moreover, the recommendation system 100 improves the search and retrieval time for a data object because the recommendation system 100 may directly access the data objects in a centralized location, rather than through disparate sources, which may involve substantial search and retrieval times. Therefore, memory requirements and computational inefficiencies may be reduced through the technological process of archiving data in the centralized document vault 102.

Figure 4:
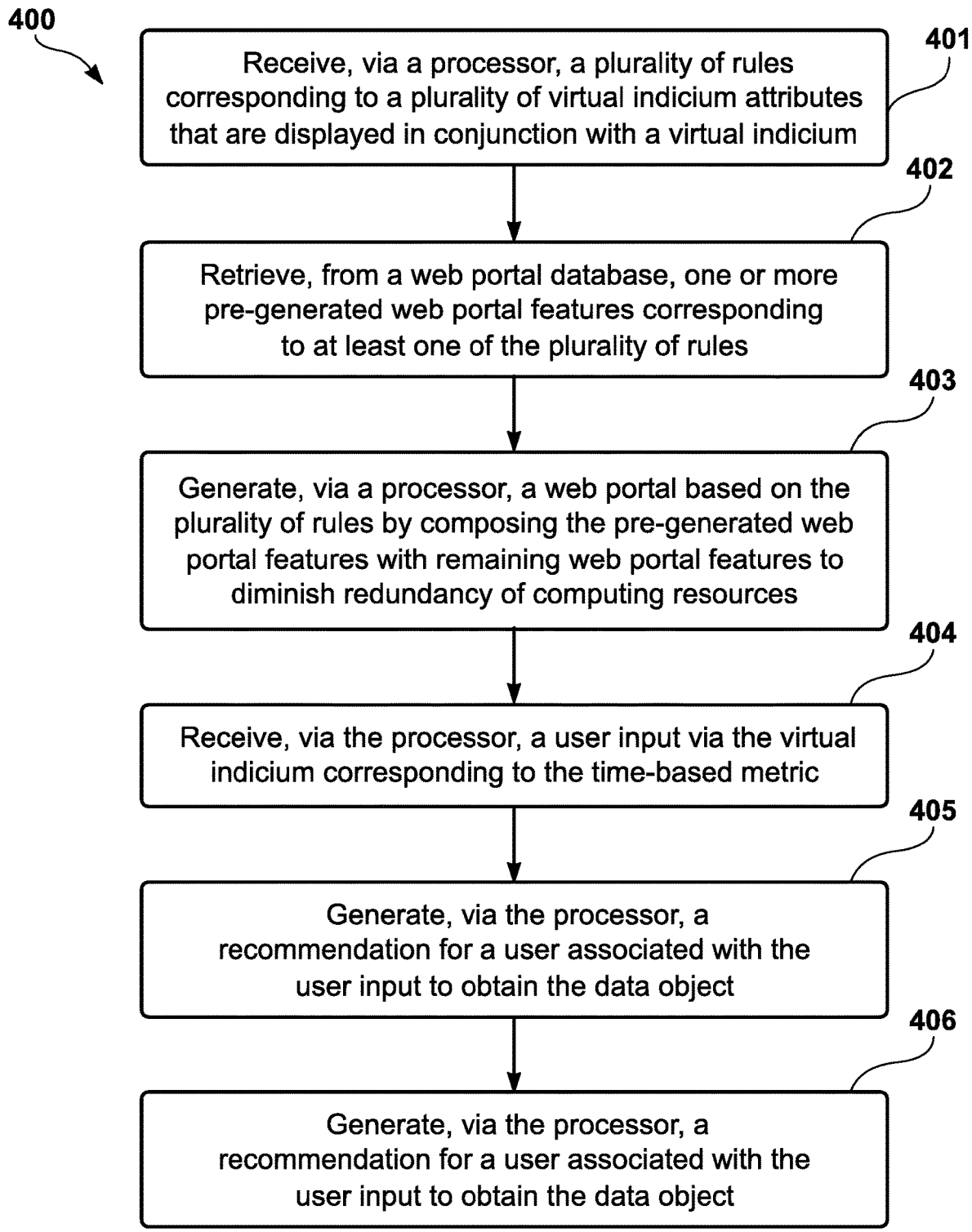
FIG. 4 illustrates a process that may be utilized by the recommendation system illustrated in FIG. 1 to generate recommendations based on the position of the virtual indicium, as exemplified in FIGS. 2A-F.

FIG. 4 illustrates a process 400 that may be utilized by the recommendation system 100 illustrated in FIG. 1 to generate recommendations based on the position of the virtual indicium, as exemplified in FIGS. 2A-E. At a process block 401, the process 400 receives, via the processor 301 (FIG. 3), a plurality of rules corresponding to a plurality of virtual indicium attributes that are displayed in conjunction with the virtual indicium 201. Each of the plurality of rules associates a data object with at least one of the plurality of virtual indicium attributes. Further, each of the plurality of virtual indicium attributes corresponding to a time-based metric.

Further, at a process block 402, the process 400 retrieves, from the web portal database 110 (FIG. 1), one or more pre-generated web portal features corresponding to at least one of the plurality of rules. In addition, at a process block 403, the process 400 generates, via the processor 301, a web portal 103 based on the plurality of rules by composing the pre-generated web portal features with remaining web portal features to diminish redundancy of computing resources. Further, at a process block 404, the process 400 receives, via the processor 301, a user input via the virtual indicium 201 (FIGS. 2A-2F) corresponding to the time-based metric. Moreover, at a process block 405, the process 400 generates, via the processor 301, a recommendation for the user 108 associated with the user input to obtain the data object. Finally, at a process block 406, the process 400 generates, via the processor 301, a recommendation indicium corresponding to the recommendation. The recommendation indicium is displayed by the web portal 103. For example, the recommendation indicium may be a virtual indicator (e.g., document name, corresponding imagery, etc.).

Although the processes described herein have been exemplified via a web portal, the process may be implemented via other types of software applications. For example, an application executed by a mobile computing device (e.g., smartphone, tablet device, smartwatch, smart wearable, etc.) may implement the aforementioned processes.

It is understood that the processes, systems, apparatuses, and computer program products described herein may also be applied in other types of processes, systems, apparatuses, and computer program products. Those skilled in the art will appreciate that the various adaptations and modifications of the embodiments of the processes, systems, apparatuses, and computer program products described herein may be configured without departing from the scope and spirit of the present processes and systems. Therefore, it is to be understood that, within the scope of the appended claims, the present processes, systems, apparatuses, and computer program products may be practiced other than as specifically described herein.

We claim:

1. A computer program product comprising a non-transitory computer useable storage device having a computer readable program, wherein the computer readable program when executed on a computer causes the computer to:
   receive, via a processor, a plurality of rules corresponding to a plurality of virtual indicium attributes that are displayed in conjunction with a virtual indicium, a first of the plurality of rules associating a first data object with at least a first subset of one of the plurality of virtual indicium attributes, a second of the plurality of rules associating a second data object with at least a second subset of the one of the plurality of virtual indicium attributes, each of the plurality of virtual indicium attributes corresponding to a distinct one of a plurality of time-based metrics, the plurality of virtual indicium attributes being displayed in time-based increments along a time span display, the first data object being distinct from the second data object;
   store, via the processor, the first data object and the second data object in a centralized data vault to diminish a data object redundancy of computing resources;
   retrieve, from a web portal database, one or more pre-generated overlapping web portal features corresponding to the first of the plurality of rules and the second of the plurality of rules;
   generate, via the processor, a web portal based on the first of the plurality of rules and the second of the plurality of rules by composing the one or more pre-generated overlapping web portal features with remaining web portal features to diminish a web portal feature redundancy of computing resources;
   receive, via the processor, a user input via the virtual indicium within the time span display corresponding to the one of the plurality of time-based metrics corresponding to the first subset of the one of the plurality of virtual indicium attributes or the second subset of the one of the plurality of virtual indicium attributes;
   generate, via the processor, a recommendation for a user associated with the user input to obtain the first data object or the second data object depending upon the user input; and
   generate, via the processor, a recommendation indicium corresponding to the recommendation, the recommendation indicium being displayed by the web portal.

2. The computer program product of claim 1, wherein the virtual indicium is a virtual image that is adjustable, via the user input, with respect to the plurality of virtual indicium attributes, wherein positioning of the virtual image in proximity to one of the plurality of virtual indicium attributes is indicative of a selection of one of the plurality of virtual indicium attributes.

3. The computer program product of claim 2, wherein the virtual image is slidable with respect to the plurality of virtual indicium attributes.

4. The computer program product of claim 1, wherein each of the plurality of virtual indicium attributes is demarcated according to a user age.

5. The computer program product of claim 1, wherein the computer is further caused to retrieve the first data object and the second data object from the data vault based upon an additional user input indicating a selection of the recommendation indicium.

6. The computer program product of claim 1, wherein the first data object and the second data object are documents corresponding to the user.

7. The computer program product of claim 1, wherein the recommendation is for obtaining the first data object and the second data object according to a time constraint associated with the plurality of time-based metrics.

8. The computer program product of claim 1, wherein the plurality of rules is predetermined and static.

9. The computer program product of claim 1, wherein the plurality of rules is dynamically updated based on statistical analysis of the first data object and the second data object being obtained by one or more additional users.

10. A system comprising:
    a web portal database that stores one or more pre-generated web portal features corresponding to at least one of a plurality of rules, the plurality of rules corresponding to a plurality of virtual indicium attributes that are displayed in conjunction with a virtual indicium, a first of the plurality of rules associating a first data object with at least a first subset of one of the plurality of virtual indicium attributes, a second of the plurality of rules associating a second data object with at least a second subset of the one of the plurality of virtual indicium attributes, each of the plurality of virtual indicium attributes corresponding to a distinct one of a plurality of time-based metrics, the plurality of virtual indicium attributes being displayed in time-based increments along a time span display, the first data object being distinct from the second data object; and
    a processor that receives the first of the plurality of rules and the second of the plurality of rules, stores the first data object and the second data object in a centralized data vault to diminish a data object redundancy of computing resources, retrieves, from the web portal database, the one or more pre-generated web portal features corresponding to the first of the plurality of rules and the second of the plurality of rules, generates a web portal based on the first of the plurality of rules and the second of the plurality of rules by composing the one or more pre-generated web portal features with remaining web portal features to diminish a web portal feature redundancy of computing resources, receives a user input via the virtual indicium within the time span display corresponding to the one of the plurality of time-based metrics corresponding to the first subset of the one of the plurality of virtual indicium attributes or the second subset of the one of the plurality of virtual indicium attributes, generates a recommendation for a user associated with the user input to obtain the first data object or the second data object depending upon the user input, and generates a recommendation indicium corresponding to the recommendation, the recommendation indicium being displayed by the web portal.

11. The system of claim 10, wherein the virtual indicium is a virtual image that is adjustable, via the user input, with respect to the plurality of virtual indicium attributes, wherein positioning of the virtual image in proximity to one of the plurality of virtual indicium attributes is indicative of a selection of one of the plurality of virtual indicium attributes.

12. The system of claim 11, wherein the virtual image is slidable with respect to the plurality of virtual indicium attributes.

13. The system of claim 10, wherein each of the plurality of virtual indicium attributes is demarcated according to a user age.

14. The system of claim 10, wherein the computer is further caused to retrieve the first data object and the second data object from the data vault based upon an additional user input indicating a selection of the recommendation indicium.

15. The system of claim 10, wherein the first data object and the second data object are documents corresponding to the user.

16. The system of claim 10, wherein the recommendation is for obtaining the first data object and the second data object according to a time constraint associated with the plurality of time-based metrics.

17. The system of claim 10, wherein the plurality of rules is predetermined and static.

18. The system of claim 10, wherein the plurality of rules is dynamically updated based on statistical analysis of the first data object and the second data object being obtained by one or more additional users.

* * * * *